United States Patent [19]

Dalke et al.

[11] 4,183,046

[45] Jan. 8, 1980

[54] ELECTRONIC APPARATUS FOR CONVERTING DIGITAL IMAGE OR GRAPHICS DATA TO COLOR VIDEO DISPLAY FORMATS AND METHOD THEREFOR

[75] Inventors: George W. Dalke, Lawrence; Michael D. Buchanan, Overland Park, both of Kans.

[73] Assignee: Interpretation Systems Incorporated, Lawrence, Kans.

[21] Appl. No.: 934,630

[22] Filed: Aug. 17, 1978

[51] Int. Cl.$^2$ .............................................. H04N 9/12

[52] U.S. Cl. ...................................... 358/22; 340/703; 358/81

[58] Field of Search ...................... 358/81, 82, 22, 21; 340/701, 703

[56] References Cited

U.S. PATENT DOCUMENTS 3,603,962 9/1971 Lechner .......................... 340/324 A

*Primary Examiner*—Robert L. Richardson

*Attorney, Agent, or Firm*—Schmidt, Johnson, Hovey & Williams

[57] ABSTRACT

A digital video color signal generation system for converting image or graphics data into a color video display format transforms source image or graphics data into a single data word comprising three separate groups of data bits which define the video display to be produced in terms of intensity, hue and saturation characteristics, and stores such data bit groups in respectively corresponding fields in a memory to allow independent user control of one or more of such characteristics. The data bit groups corresponding to hue and saturation are employed for simultaneously addressing storage locations in memory devices which contain digital color reference data representing symmetrically mapped combinations of hue and saturation values, which data are read-out and delivered to respectively associated multiplying digital-to-analog converters for producing red, blue and green color video signals. The group of data bits corresponding to intensity are directly converted to analog signals which are employed to control the reference voltage input of each of the multiplying digital-to-analog converters in a manner which modulates the magnitude of each of the video signals to permit varying the intensity of the resulting video display without also altering either of the hue or saturation.

16 Claims, 3 Drawing Figures

ELECTRONIC APPARATUS FOR CONVERTING DIGITAL IMAGE OR GRAPHICS DATA TO COLOR VIDEO DISPLAY FORMATS AND METHOD THEREFOR

TECHNICAL FIELD

This invention generally deals with computergraphics and pertains more particularly to a system for converting digital image or graphics data to color video display formats.

BACKGROUND ART

The use of electronic color generation circuitry for converting digital image data to color video signals in order to display color images on a cathode ray tube or the like is an art recognized concept. Known prior art systems typically employ a color signal generator consisting of three memory devices corresponding to the primary colors of red, blue and green, each of which memory devices have color reference data stored therein. The color reference data may be read from memory and combined to produce an additive color video display which is characterized by a predetermined, somewhat arbitrary set of values of intensity, hue and saturation. Intensity (brightness) relates to the luminance of the color, and saturation characterizes the purity of the color, i.e., the extent to which it is mixed with white, while hue relates to the dominant wave length of color. The color reference data output from the three memory devices is converted to analog signals which are employed as the red, blue and green video signals to form an additive color image on a cathode ray tube. Thus, a given set of digital image data delivered to the three memory devices, which are commonly referred to in the art as "look-up tables," results in a color image whose hue and saturation are determined by the relative proportions of red, blue and green video signals derived from the respectively associated look-up tables while the perceived intensity of such color image is determined by the sum of these three primary colors. Prior art devices have included means for allowing a user to alter the digital image input data for the purpose of changing the colors in the resultant color video image (which also incidentally changes the values of intensity, hue and saturation of such color video image), however, for reasons discussed below, the resulting changes in the color video image produced undesirable results as perceived by a viewer.

The undesirable results mentioned above are related to the fact that the color characteristics of intensity, hue and saturation are not simple functions of the red, blue and green color levels, but are highly interdependent and are interrelated by complex mathematical formulae. For example, hue and saturation are complex ratio functions of the primary color levels, while intensity is a function of the sum of such color levels. These relationships are further complicated by the nonlinear response or "gamma" of television systems. Although in the past a user has had the flexibility to alter or transform the source image data in a manner to change the levels of red, blue or green color levels, it was extremely difficult, if not completely impossible, to predict the particular combinations of intensity, hue and saturation which would result from such alteration of the source image data. Thus, for example, it was heretofore impossible for a user to change the resulting color video display from one hue to another which was at the same perceived saturation and intensity. Similarly, it was not possible to change the intensity of the display without also changing the hue or saturation thereof, or to change the saturation level of the display without also changing hue and intensity. This inability to independently alter the perceived color characteristics of intensity, hue and saturation was a significant disadvantage, since the capability to independently control intensity, hue and saturation of a color image provides additional flexibility in performing significant analytical and diagnostic operations with color television systems.

DISCLOSURE OF INVENTION

The present invention involves transferring digital image or graphics data to color video image formats in terms of the humanly perceived color characteristics of intensity, hue and saturation. The digital image data is first transformed into coded words each having three distinct groups or fields of data bits respectively corresponding to intensity, hue and saturation of the display to be produced, which coded words are delivered to a digital memory for temporary storage therein. The data bit groups corresponding to hue and saturation are simultaneously delivered from the digital memory to the address inputs of each of three color look-up tables in the form of programmable read-only memories (PROM's ) respectively corresponding to the primary colors of red, blue and green, each of which PROM's produces a unique binary output upon input thereto of a particular set of data in the last mentioned groups thereof. The simultaneous binary outputs from the PROM's define red, blue, and green color combinations, which, when added together, form resultant video images whose color varies in discrete steps along both the hue and saturation axes of color space defined in a theoretical color triangle, which resultant color video images are all at exactly the same intensity or "brightness" level. The binary output from each of the PROM's is delivered to one input of respectively corresponding multiplying, digital-to-analog converts (MDACs) while the data bit group of each coded word corresponding to intensity is converted to an analog signal which is then received by a second input of each such MDAC and is employed to modulate the latter's reference input voltage, thereby, in effect, multiplying the MDACs analog output signal. The modulated analog output signals from each of the MDACs have television synchronizing and blanking signals added thereto to form color video signals for producing color video images on a cathode ray tube or the like. Since the source image data is transformed in terms of a coded word defining intensity, hue and saturation of the resultant color video display, either intensity, hue or saturation may be independently varied by merely altering the coded word using conventional techniques.

BEST MODE FOR CARRYING OUT THE INVENTION

Figures 1, 2, 3:
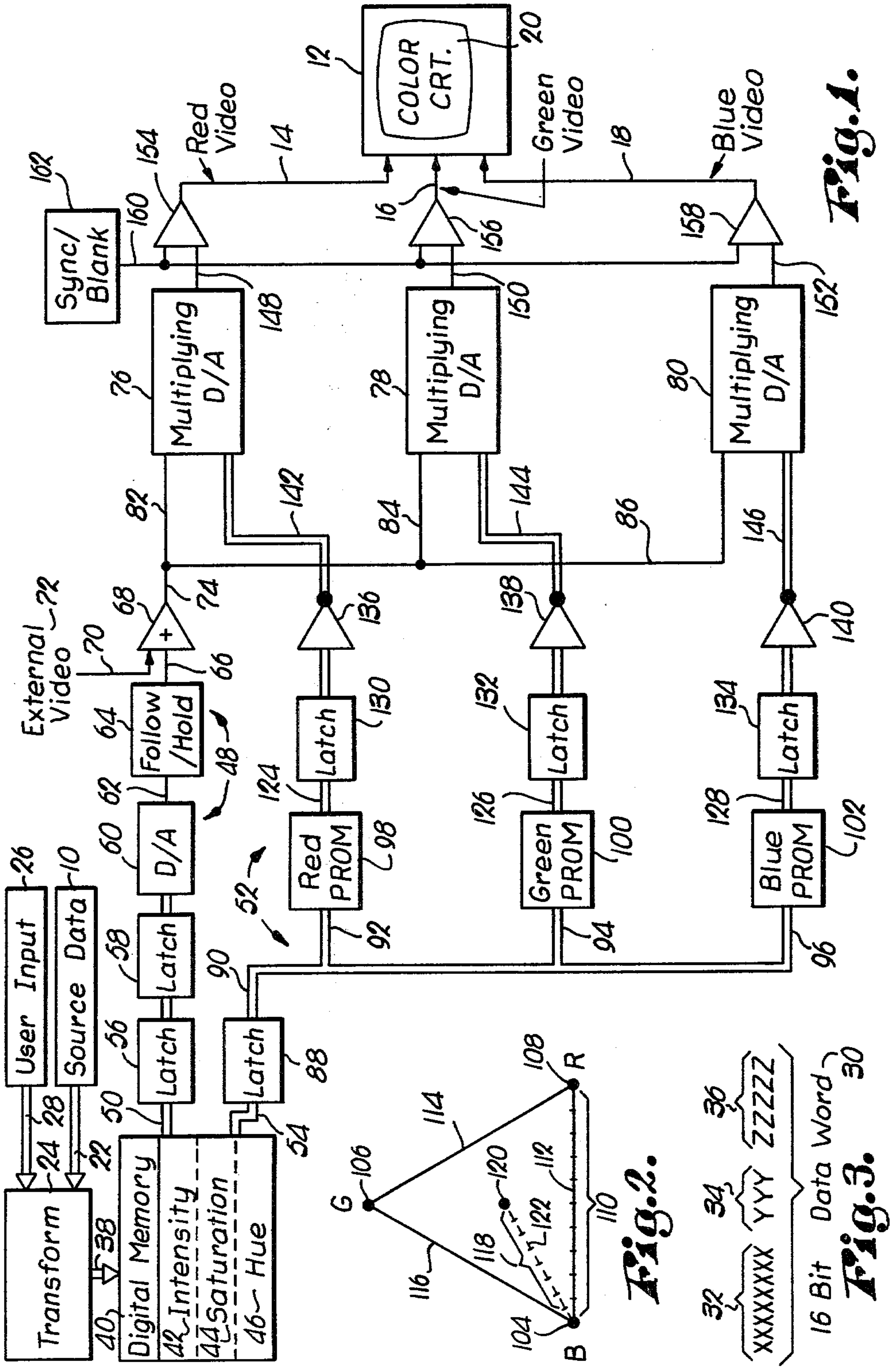
FIG. 1 is a combined block, schematic and diagrammatic view of electronic apparatus for converting digital image or graphics data to color video display formats used in practicing a novel method therefor, and which forms the currently preferred embodiment of the present invention.
FIG. 2 is a graphical representation of a scheme for mapping color reference data into the storage devices.
FIG. 3 shows the organization of a 16 bit data word used in connection with the apparatus shown in FIG. 1.

Referring now to FIGS. 1 through 3, the invention is broadly concerned with the conversion of source image or graphics type data 10 to a format suitable for display on a conventional color television 12 having red, green and blue video inputs thereto respectively represented by lines 14, 16 and 18 which are employed to produce a color video display using ordinary color additive techniques on the cathode ray tube screen 20.

The source data 10 represents an actual image or the like (not shown) in the form of digital information in image-like format which may be obtained using ordinary digital conversion or generation techniques. Source data 10 is delivered via data bus 22 to transform means 24, a second input to transform means 24 being received from the user input 26, via data bus 28. Transform means 24 may comprise any of various means for transforming the source data 10 into a 16 bit data word 30 having three groups or fields of binary information characters respectively represented by the numerals 32, 34 and 36, and those skilled in the art will be capable of readily devising the transform means 24 using software, firmware or hardware techniques. In the preferred form, character groups 32, 34 and 36 respectively comprise 8, 3, and 5 information characters and are respectively associated with the intensity, saturation and hue characteristics of the image displayed on the screen 20, or in other words, 8 bits of data are associated with intensity, 3 bits of data are associated with saturation and 5 bits of data are associated with hue. The user input 26 may comprise any of various devices controllable by the user of the apparatus for altering the operation of transform means 24 in a manner to independently change the information represented in one or more of the groups of data bits 32, 34 or 36 respectively.

Each of the 16 bit data words 30 produced by transform means 24 is delivered via data bus 38 to a specific memory location in a conventional digital memory means 40 wherein each of such memory locations includes storage fields shown by the numerals 42, 44 and 46 which correspond with, and allow storage of, the three groups of data bits 32, 34 and 36 respectively. An intensity control circuit generally indicated by the numeral 48 is operably coupled by data bus 50 to the memory means 40 and more particularly to the latter's data output lines corresponding to the storage field 42, while a hue and saturation control circuit generally indicated by the numeral 52 is also operably coupled, by data bus 54, to memory means 40 and more particularly to the latter's data output lines corresponding to storage fields 44 and 46. Thus, it may be appreciated that the 8 bits of data comprising data bit group 32 are delivered to the intensity control circuit 48 while the 8 bits of data comprising data bit groups 34 and 36 are delivered only to the hue and saturation control circuit 52.

The intensity control circuit 48 includes a pair of conventional latch circuits 56 and 58 operably coupled between the data bus 50 and a digital-to-analog converter 60 to hold data on the input of converters 60 a prescribed time interval. Converter 60 is a conventional device which converts the 8 bits of data on data bus 50 corresponding to data bit group 32 to an electrical analog signal whose magnitude varies in accordance with a value represented by data bit group 32. The analog output of converter 60 is delivered on line 62 to the input of a follow/hold circuit 64, thence on line 66 to one input of a signal amplifier 68, an optional second input to the amplifier 68 being formed by line 70 which is coupled with a source of external video signals 72. The amplified output signals produced by signal amplifier 68 on line 74 are simultaneously delivered to the inputs of three multiplying, digital-to-analog converters (MDAC) respectively designated by the numerals 76, 78 and 80 via corresponding lines 82, 84 and 86, the construction and operation of which MDACs will be discussed below in more detail in connection with the hue and saturation control circuit 52. Data bus 54 is operably coupled through a data holding latch 88 and data bus 90 to the respective address busses 92, 94 and 96 of corresponding data storage devices 98, 100 and 102 which are preferably in the form of programmable read-only-memories (PROM's) and are respectively associated with the generation of the previously mentioned red, green and blue color video signals on lines 14, 16 and 18 respectively. Storage devices 98, 100 and 102 are preprogrammed to collectively store therein a plurality of color reference data values which, when combined, produce a visual color display on the screen 20 having a specific hue and saturation.

A better understanding of the scheme for programming the storage device 98, 100 and 102 may be obtained by referring now more particularly to FIG. 2 which depicts in graphic form, commonly known in the art as "Maxwell's Triangle," the relationship of the primary colors in terms of the color characteristics of hue and saturation. The apexes 104, 106 and 108 of the triangle respectively correspond to the blue, green and red primary colors having maximum values of saturation, while reference points, such as at 110, lying along each of the legs 112, 114 and 116 of the triangle represent colors having various hues each at the same level of saturation. Points lying inside the triangle, such as at 118, correspond to various colors having saturation values less than maximum; the centrally located point 120 represents the color of white (i.e., completely unsaturated) while points successively distant from point 120 (toward any of the legs 112, 114 or 116) represent colors having higher values of saturation. Thus, for example, the points 118 lying along the dotted line 122 which extends from point 120 to apex 104 represent a predominantly blue hue at various levels of saturation, however, it can be appreciated that those of the points 118 proximate to the point 120 represent colors having small amounts of green and red hues as well as the predominant hue of blue.

In connection with the present invention, the reference points lying within the color triangle which are defined by specific combinations of values of hue and saturation are "mapped" or stored into the storage devices 98, 100 and 102. Corresponding storage locations in each of the storage devices 98, 100 and 102 may be simultaneously addressed by the same address word on data bus 90 (which incidentally corresponds to the 8 bit word formed by the data bit groups 34 and 36 of the 16 bit data word 30), and have stored therein color reference data values, which, when later converted to analog video signals, may be combined to produce a color video display having hue and saturation characteristics corresponding to one of the reference points on the color triangle. In the preferred form, each of the storage devices 98, 100 and 102 possesses a storage capacity of two hundred and fifty-six 8 bit words, consequently, the storage devices 98, 100 and 102 have collectively stored in corresponding memory locations thereof color generating reference data values corresponding to two hundred and fifty six combinations of hue and saturation characteristics. Also in connection with the preferred form of the invention, 32 values of hue (including black and white) may be selected using the data bit group 36 while 8 values of saturation may be selected by the data bit group 34. In summary then, it can be appreciated that the simultaneous output from the storage devices 98, 100 and 102 on the respectively corresponding data busses 124, 126 and 128 provide two hundred and fifty-six possible combinations of hue and saturation defined by 8 possible levels of saturation and 32 possible levels of hue, which combinations are symmetrically mapped on the color triangle.

The color reference data values delivered on data busses 124, 126 and 128 are input to corresponding data holding latches 130, 132 and 134 whose respective outputs are amplified by the signal drivers 136, 138 and 140. The amplified, digital color reference data values are then delivered via data busses 142, 144 and 146 to the digital inputs of the respectively corresponding MDACs 76, 78 and 80. Each of the MDACs 76, 78 and 80 is a conventional, commercially available device wherein the reference voltage employed thereby to scale the resulting analog output therefrom is derived from the analog signal present on line 74. Thus, in effect, the digital data values on busses 142, 144 and 146 are multiplied during their conversion to analog signals which latter mentioned signals are output from the MDACs 76, 78 and 80 on respectively associated output lines 148, 150 and 152, with the value of the analog signal on lines 82, 84 and 86 acting as the multiplier. Recalling now that the analog signal on line 74 may comprise any of two hundred and fifty-six levels of magnitude by virtue of its derivation from an 8 bit data word, it may be readily appreciated that the analog output signals on lines 148, 150 and 152 may comprise any of more than sixty five thousand levels of magnitude derived from the $256 \times 256$ data values on the analog input lines (82, 84 and 86) and the digital input lines (142, 144 and 146) to each of the MDACs 76, 78 and 80.

The analog, color reference signals on lines 148, 150 and 152 are delivered to one input of the respectively corresponding video amplifiers 154, 156 and 158, a second input to such amplifiers being derived via line 160 from a suitable, conventional source of synchronizing/blanking signals 162 normally employed in the production of television video signals. The outputs of amplifiers 154, 156 and 158 are the amplified, color video signals previously mentioned which are respectively delivered on lines 14, 16 and 18 to the color television 12 and are combined to produce a color visual display having intensity, saturation and hue characteristics corresponding to the information represented by data bit groups 32, 34 and 36 of the data word 30.

From the foregoing description, it is apparent that a novel, device implemented method has been provided for converting digital image or graphics data to video display formats in a manner which allows independent control of the resulting video display in terms of the color perception characteristics of intensity, saturation and hue. For example, by employing the user input 26 to alter the transform 24, a user may independently alter any of the data within the data bit groups 32, 34 or 36 to independently control intensity, saturation or hue respectively of the resulting color display. In the event that the user wishes to alter the intensity of the resulting video display, operation of the user input 26 will alter the information in the data bit group 32 which in turn will vary the magnitude of the analog signal on lines 82, 84 and 86, thereby changing the signal level on lines 148, 150 and 152. In the event that the user wishes to alter saturation without also altering intensity or hue, operation of the user input 26 to alter the information within the data bit group 34 results in different address data being delivered on line 90, which in turn causes different storage locations to be addressed in the storage devices 98, 100 and 102, whereby the color reference data values read-out from such storage device is representative of a color whose hue characteristics are unchanged but whose saturation level has been altered in accordance with the altered information represented by data bit group 34.

INDUSTRIAL APPLICABILITY

The present invention may be employed in connection with any of various types of color video display systems in which red, green and blue video signals are combined additively to produce a resulting color display. Those skilled in the art will appreciate that multiple memory means may be employed in lieu of the digital memory means 40 to allow independent storage of groups of data bits corresponding to intensity, hue and saturation of the video display format. Moreover, although a 16 bit data word 30 has been employed in connection with the preferred form of the invention for converting image data to a color video display format, it can be appreciated that data words having greater or fewer data bits may likewise be effectively employed, with the storage capacity of the storage devices 98, 100 and 102 being selected accordingly.

From the foregoing, it is clear that the invention provides an effective system for converting digital image or graphics data to color video display formats in a manner which allows independent control of the intensity, hue and saturation characteristics of the resulting display, and which is particularly efficient in terms of the digital memory capacity which is required. Thus, it will be observed that the method and apparatus disclosed herein not only provide for the reliable accomplishment of the object of the invention, but do so in a particularly effective and economical manner. It is recognized, of course, that those skilled in the art may make various modifications or additions to the preferred embodiment chosen to illustrate the invention without departing from the gist and essence of our contribution to the art. Accordingly, it is to be understood that the protection sought and to be afforded hereby should be deemed to extend to the subject matter claimed and all equivalents thereof fairly within the scope of the invention.

Having thus described the invention, what is claimed as new and desired to be secured by Letters Patent is:

1. A method of converting image data to a color video display format, including the steps of:

(A) transforming said image data into a data word having first, second, and third groups of information characters respectively associated with the intensity, hue and saturation characteristics of said format;

(B) generating a set of color data in accordance with the information represented by said second and third groups of information characters in said word;

(C) altering said set of color data in accordance with the information represented by said first group of information characters in said word;

(D) producing said format using said altered set of color data.

2. The invention of claim 1, including the step of: storing said data word in a memory prior to performing step (B).

3. The invention of claim 1, wherein step (B) is performed by:

storing said color data in addressable storage locations of a memory, addressing certain selected ones of said storage locations using said second and third groups of information characters in said word, and reading said color data from said selected ones of said storage locations.

4. The invention of claim 1, including the steps of:

converting said first group of information characters in said word to a first electrical signal, and converting said color data into a plurality of second electrical signals, step (C) being performed by modulating the magnitude of each of said second electrical signals using said first electrical signal.

5. The invention of claim 1, including the step of: altering the information characters in one of said groups thereof whereby to independently modify a corresponding one of said format characteristics.

6. The invention of claim 1, wherein step (D) is performed by:

converting said altered set of color data to color video signals, and combining said color video signals to generate said format.

7. A method of independently controlling the intensity, hue and saturation of a color video display format converted from source image data, including the steps of:

(A) storing data information corresponding to said image in first, second, and third discrete memory locations respectively associated with the intensity, hue and saturation characteristics of said display format;

(B) storing color generating reference data in storage locations;

(C) selectively addressing certain of said storage locations using said data information stored in said second and third memory locations, whereby to read out the color generating reference data stored in said certain storage locations;

(D) producing an intensity control signal using said data information stored in said first memory location;

(E) converting said color generating reference data read out of said certain storage locations to electrical analog signals;

(F) operating on each of said electrical analog signals using said intensity control signal whereby to produce color video signals; and (G) combining said color video signals to produce said color video display format having intensity, hue and saturation characteristics corresponding to said data information.

8. The invention of claim 7, including the step of: changing at least certain of said data information in at least one of said memory locations whereby to independently change the associated one of said characteristics of said display format.

9. The invention of claim 8, including the step of: transforming said source image data into a data word having first, second and third groups of data characters corresponding to said data information, and being respectively associated with said first, second and third memory locations.

10. The invention of claim 7, wherein step (D) is performed by converting said data information stored in said first memory location into an electrical analog signal.

11. The invention of claim 7, wherein step (F) is performed by using said intensity control signal to modulate each of said electrical analog signals.

12. Apparatus for converting image data to a color video display format, and of the type including means for transforming color video signals into said format, including:

first digital memory means for storing therein first, second and third groups of digital image information corresponding to said image data and respectively associated with the intensity, hue and saturation of said display format;

second digital memory means operably coupled with said first memory means and including addressable memory locations adapted for storing therein digital color data used in the generation of said color video signals, each of said memory locations being selectively addressable by said second and third groups of digital image information; and means operably coupled with said first and second memory means for receiving said first group of digital image information from said first memory means and for operating on said color data using said first group of image information to produce said color video signals.

13. The invention of claim 12, including means operably coupled with said first memory means for transforming said image data into said first, said second, and said third groups of said information.

14. The invention of claim 12, wherein said receiving and operating means includes:

first means for converting said first group of digital image information to an electrical analog control signal, and second means provided with a reference voltage input operably coupled with said first converting means and being operably coupled with said second memory means for converting said color data to color video signals.

15. Apparatus for converting image data to a color video display format, including:

means for transforming said image data into first, second and third groups of digitized information respectively associated with the intensity, hue and saturation of said display format;

digital memory means operably coupled with said transforming means and provided with first, second and third fields of information storage for respectively storing said first, said second and said third groups of said digitized information therein;

a plurality of data storage means respectively corresponding to the generation of first, second and third primary colors in said display format, each of said data storage means being operably coupled with said second and third fields of said memory means and including a plurality of addressable storage locations each adapted for storing therein digital color reference data for generating a corresponding primary color, said storage locations in each of said data storage means being selectively addressable by said second and third groups of said digitized information to allow read out of said color reference data therefrom;

means operably coupled with said first field of said memory means for receiving and converting said first group of digitized information stored therein into an analog electrical control signal;

means operably coupled with each of said data storage means for converting said color reference data read out of said storage locations into corresponding analog color signals, said reference data converting means being provided with a reference voltage input operably coupled with said information converting means for receiving said control signal from the latter, and being operative to convert said color reference data in accordance with the magnitude of said control signal; and means operably coupled with said reference data converting means for producing said display format using said color signals, said display format having intensity, hue and saturation characteristics corresponding to said digitized information stored in said memory means.

16. The invention of claim 15, wherein there is further provided means operably coupled with said transforming means for independently altering said digitized information in each of said groups thereof whereby to allow independent alteration of the intensity, hue and saturation characteristics of said display format.

* * * * *